US012015892B2

(12) United States Patent
Schmidt

(10) Patent No.: US 12,015,892 B2
(45) **Date of Patent: *Jun. 18, 2024**

(54) HEARING DEVICE ASSEMBLY

(71) Applicant: GN Hearing A/S, Ballerup (DK)

(72) Inventor: Flemming Schmidt, Virum (DK)

(73) Assignee: GN HEARING A/S, Ballerup (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,853

(22) Filed: Feb. 15, 2023

(65) Prior Publication Data

US 2023/0188881 A1 Jun. 15, 2023

Related U.S. Application Data

(63) Continuation of application No. 17/339,784, filed on Jun. 4, 2021, now Pat. No. 11,638,080.

(30) Foreign Application Priority Data

Jun. 30, 2020 (DK) .......................... PA 2020 70431
Mar. 29, 2021 (DK) .......................... PA 2021 70150

(51) Int. Cl.
*H04R 25/00* (2006.01)
*H04R 1/10* (2006.01)

(52) U.S. Cl.
CPC ......... *H04R 1/1016* (2013.01); *H04R 1/1008* (2013.01); *H04R 25/505* (2013.01); *H04R 25/609* (2019.05); *H04R 2225/0213* (2019.05); *H04R 2225/55* (2013.01)

(58) Field of Classification Search
CPC .... H04R 1/1033; H04R 25/55; H04R 25/556; H04R 2225/57
See application file for complete search history.

(56) References Cited

U.S. PATENT DOCUMENTS

| | | | | |
|---|---|---|---|---|
| 7,286,678 | B1 * | 10/2007 | Bachler | H04R 25/70 381/314 |
| 7,502,653 | B2 | 3/2009 | Daly | |
| 7,844,065 | B2 * | 11/2010 | von Dombrowski | H04R 25/48 381/328 |
| 8,855,323 | B2 * | 10/2014 | Kroman | H04R 25/305 381/314 |
| 8,867,765 | B2 | 10/2014 | Solum | |
| 9,232,320 | B2 * | 1/2016 | Hartley | H04R 25/558 |

(Continued)

FOREIGN PATENT DOCUMENTS

| | | | |
|---|---|---|---|
| CN | 1817008 | 8/2006 | |
| CN | 1817008 A * | 8/2006 | H04L 29/06 |

(Continued)

OTHER PUBLICATIONS

Foreign Office Action dated May 26, 2021 issued for Danish patent application No. PA 2021 70150.

(Continued)

*Primary Examiner* — Ryan Robinson

(74) *Attorney, Agent, or Firm* — Vista IP Law Group, LLP

(57) ABSTRACT

The present disclosure relates to a hearing device assembly comprising a behind-the-ear base unit and an in-the-ear transducer module, which communicate via a communication interface and wherein the base unit is configured to detect whether the transducer module comprises a microcontroller.

17 Claims, 5 Drawing Sheets

(56) References Cited

U.S. PATENT DOCUMENTS

| | | | | |
|---|---|---|---|---|
| 9,319,801 | B2 * | 4/2016 | Gottschalk | H04R 25/305 |
| 9,426,587 | B2 * | 8/2016 | Stoffels | H04R 25/60 |
| 9,445,204 | B1 * | 9/2016 | Ryan | H04R 25/556 |
| 9,516,432 | B2 | 12/2016 | Solum | |
| 9,516,485 | B1 | 12/2016 | Bowers et al. | |
| 9,980,029 | B2 * | 5/2018 | Vos | H04R 1/1016 |
| 10,051,392 | B2 | 8/2018 | Schmidt et al. | |
| 10,911,867 | B2 * | 2/2021 | Pedersen | H04R 1/40 |
| 2007/0014423 | A1 | 1/2007 | Darbut et al. | |
| 2007/0230727 | A1 | 10/2007 | Sanguino et al. | |
| 2008/0021517 | A1 | 1/2008 | Dietrich | |
| 2009/0196444 | A1 | 8/2009 | Solum | |
| 2009/0306742 | A1 | 12/2009 | Van Dijk et al. | |
| 2010/0272272 | A1 | 12/2010 | Müller et al. | |
| 2013/0329926 | A1 | 12/2013 | Sacha | |
| 2014/0205122 | A1 | 7/2014 | Stoffels et al. | |
| 2015/0172834 | A1 | 6/2015 | Solum | |
| 2015/0215131 | A1 | 7/2015 | Paul et al. | |
| 2015/0237450 | A1 * | 8/2015 | Schmidt | H04R 25/70<br>381/314 |
| 2016/0217090 | A1 | 7/2016 | Sengoku et al. | |
| 2017/0150279 | A1 | 5/2017 | Solum | |
| 2017/0286918 | A1 * | 10/2017 | Westermann | G06Q 30/0601 |
| 2018/0270117 | A1 * | 9/2018 | Miller | H04L 67/34 |
| 2019/0281396 | A1 | 9/2019 | Møller et al. | |
| 2020/0092663 | A1 | 3/2020 | Bergmann et al. | |
| 2021/0044911 | A1 * | 2/2021 | Møller | H04R 25/60 |
| 2022/0201410 | A1 * | 6/2022 | Roug | H04R 25/609 |

FOREIGN PATENT DOCUMENTS

| | | |
|---|---|---|
| DE | 102008030551 | 8/2009 |
| EP | 2663095 | 11/2013 |
| EP | 3101917 | 12/2016 |
| EP | 3343952 | 7/2018 |
| GB | 2488223 | 8/2012 |
| WO | WO 2017083634 | 5/2017 |
| WO | WO 2019/204334 | 10/2019 |

OTHER PUBLICATIONS

Foreign Office Action dated Dec. 18, 2020 issued for Danish patent application No. PA 2020 70431.

Winokur, Eric S. et al., "A Wearable Vital Signs Monitor at the Ear for Continuous Heart Rate and Pulse Transit Time Measurements", 978-1-4577-1787-1/12/$26.00, copyright 2012 IEEE.

Extended European Search Report for EP Patent Appln. No. 21179596.8 dated Apr. 12, 2022.

Extended European Search Report for EP Patent Appln. No. 21179593.5 dated Apr. 12, 2022.

Non-Final Office Action for U.S. Appl. No. 17/339,784 dated Aug. 4, 2022.

Non-Final Office Action for U.S. Appl. No. 17/339,729 dated Aug. 4, 2022.

Notice of Allowance for U.S. Appl. No. 17/339,729 dated Dec. 15, 2022.

Notice of Allowance for U.S. Appl. No. 17/339,784 dated Nov. 30, 2022.

* cited by examiner

HEARING DEVICE ASSEMBLY

RELATED APPLICATION DATA

This application is a continuation of U.S. patent application Ser. No. 17/339,784 filed on Jun. 4, 2021, which claims priority to, and the benefit of, Danish patent application No. PA 2020 70431 filed on Jun. 30, 2020, and Danish patent application No. PA 2021 70150 filed on Mar. 29, 2021. The entire disclosures of the above applications are expressly incorporated by reference herein.

FIELD

The present disclosure relates to a hearing device assembly having a behind-the-ear base unit and an in-the-ear transducer module, which communicate via a communication interface. The transducer module asserts/activates a signal on the interface at boot or when hot-plugged, the base unit detects the asserted/activated signal and supplies power to the transducer module after detection of the signal, and the base unit is further configured to detect whether the transducer module comprises a microcontroller.

Further, the disclosure relates to a method of assigning communication roles between a behind-the-ear base unit and an in-the-ear transducer module in a hearing device assembly.

BACKGROUND

A hearing device assembly may be a headset, headphones, earphones, hearing aids, or other head-wearable hearing device assembly. Such hearing device assemblies will contain a plurality of electronic components and circuits that creates audible sound for either or both ears of a user. On the way to an ear of the user, some or all of the sound may be digitized and may be altered by one or more of the components and circuits, e.g. the sound may be amplified, filtered, moderated, equalized, adjusted, etc. To this end, a hearing device assembly will contain an audio processing unit, often a so-called Digital Signal Processor (DSP), which processes signals received from one or more microphones, one or more accelerometers and/or sensors picking up vibrations generated by sound or received via a wireless or wired communication interface/bus system. The processed sound signal is then transmitted to a loudspeaker or receiver, which produces audible sound in or near the ear canal of the user. The processed sound signal may be Digital-to-Analog (D/A) converted before being transmitted to the loudspeaker or receiver.

In some hearing device assemblies, the receiver is placed in the ear, i.e. in the ear canal, of the user, e.g. in receiver-in-ear earphones or receiver-in-ear (RIE) hearing aids, and a base unit containing the audio processing unit sits behind the ear of the user. The receiver receives electronic signals from the audio processing unit, which are then converted to audible sound. The receiver may be included in a transducer module, potentially together with one or more additional transducers such as a sensor. The transducer module sits in the ear canal of the user and is kept in the right location using either a dome or a custom mold. The custom mold may be fitted to suit the ear of a particular user and/or may surround the receiver. The dome may be made from a flexible material and/or placed at one end of the transducer module. The one end is the end of the transducer module closest to the eardrum when placed in the ear canal of the user.

Transducer modules may be exchangeable such that one transducer module can be exchanged for another. This provides a number of benefits for a user, such as to allow the user to upgrade to a newer, better receiver, a receiver having more functionality in cooperation with the dispenser, etc.

In the case of a receiver-in-ear hearing aid having a detachable transducer module and more than one type of receivers configured to be detachable attached to the base unit, there is a risk that the signal processing setting in the base unit does not match the attached or plugged in receiver. The different types of receivers could comprise one or more of a low-power receiver, a medium-power receiver, a high-power receiver, and an ultra-power receiver. In case the signal processer is set to transmit a processed audio signal to a low-power receiver and a high-power receiver has been attached, the user may be harmed by loud sounds. However, by incorporating, in the transducer module, a non-volatile memory (NVM) element containing stored information such as transducer module characteristics including e.g. transducer module identification data, particularly of the receiver, this disadvantage can be reduced or eliminated. When an exchange is made the base unit can detect that something has happened, initialize communication with the transducer module, read the content of the NVM and make appropriate changes to the output to match the altered parameters of the receiver. In case of a discrepancy, i.e. configuration mismatch, the base unit can choose to e.g. not send signals to the transducer module or to send signals that it can be certain will result in low volume audible sound by the receiver to ensure that the user is not distressed or harmed by loud sounds. In case of a discrepancy, i.e. configuration mismatch, the base unit may additionally send a warning, such as an audible warning, to the user. This may be relevant both during fitting and afterwards in case the user swaps transducer modules themselves.

In the case of a receiver-in-ear hearing aid having a detachable receiver, the receiver may have properties within a predetermined tolerance. A further advantage of incorporating, in the transducer module, a non-volatile memory (NVM) element containing stored information such as transducer module characteristics including e.g. transducer module identification data, and various performance parameters including e.g. a production calibration offsets, is that the base unit, when a receiver is attached or plugged in, can initialize communication with the transducer module, read the content of the NVM and by reading the content of the NVM make appropriate changes to the signal processing to match the actual properties of the attached or plugged in receiver. Thereby the production calibration offset in the NVM may be used for reduction of receiver to receiver tolerances.

In such an assembly with an NVM-containing transducer module, the base unit will initiate communication and is said to act as master and the NVM as slave in the communication. After the initial communication occurring when a transducer module is connected/mounted no further communication except for processed sound signals need to be exchanged between the base unit and the transducer module.

However, to allow for more functionality of the hearing device assembly, the base unit can advantageously be configured to act as either master or slave as this will allow for the use of more advanced transducer modules that can take on the communication role of master. Such advanced transducer modules could, for example, contain auxiliary components such as sensors, which produce data that the transducer module will want to transmit to the base unit and/or electromechanical devices. A disadvantage if only the base unit can act as master is that it will need to frequently ping the transducer module to check if it has data to be shared with the base unit. Such frequent pinging will use power from the battery and may cause noise to appear in the delicate audio processing circuitry of the hearing aid assembly, in particular if the additional functionality of the transducer module includes one or more microphones. Thus, there is a need in the art for a hearing device assembly, wherein the above-mentioned disadvantages are mitigated or removed.

In the hearing device assembly disclosed herein, the transducer module will dictate whether the base unit acts as master or as slave. The transducer module may contain a microcontroller, which could contain the NVM and act as controller for a number of additional functionalities such as e.g. one or more sensors and/or electromechanical devices within the transducer module.

Preferably, the base unit in such a hearing device assembly is able to act as slave when connected with a transducer module, which is configured to act as master, and act as master when connected with a transducer module, which is not configured to act as master.

SUMMARY

In a first aspect is provided a hearing device assembly and in a second aspect is provided a method of assigning communication roles in such a hearing device assembly.

In the first aspect, the hearing device assembly comprises a behind-the-ear base unit and an in-the-ear transducer module, where the base unit and the transducer module are both configured to electronically communicate with each other via a communication interface/bus connecting the base unit and the transducer module. The transducer module is further configured to assert/activate a signal on the communication interface/bus during boot of the base unit or when the transducer module is hot plugged to the base unit, and the base unit is further configured to detect the signal asserted by the transducer module and to supply power to the transducer module following detection of the signal. The base unit is further configured to detect whether the transducer module comprises a microcontroller.

Assert is used to mean the activation of a signal. A communication interface/bus will act to facilitate communication between two or more devices. One of the devices will act as master and it is the master device, which initiates activity on the device communication interface simplifying the avoidance of collisions. The communication interface/bus can be realised with one or multiple wires, i.e. with 1, 2, 3, . . . , N wires. The actual signal on the wire, or on one or more of the wires, may be a low electrical level or it may be a high electrical level. It is known to a skilled person that for some system configurations active or asserted means high and for others it means low. If the communication interface/bus comprises multiple/a plurality of wires thus allowing for signals to be asserted/activated on one or more of the plurality of wires, one or more signals will be selected, i.e. one or more wires will be active, to convey the communication between the base unit and the transducer module.

In an embodiment, the communication interface/bus is a single wire, or 1-Wire, interface, a well-known device communication interface/bus system, which always has one master, i.e. one device acting as master, in overall control. The master initiates activity on the interface/bus, simplifying the avoidance of collisions on the interface/bus.

Boot of the base unit occurs when power is supplied to one or more electronic components or circuits of the base unit, which may be achieved in a variety of ways. For example, a switch on the base unit could be flipped resulting in power from a battery being connected electrically to one or more electronic components or circuits in the base unit. A transducer module may or may not be connected when boot of the base unit occurs. If a transducer module is connected, when the hearing aid boots, the base unit may start supplying power to the transducer module after completion of the boot, i.e. the base unit may power the transducer module in a second step after powering the base unit, wherein the second step may be initiated after completion of the boot of the base unit. If no transducer module is connected at the time, when the base unit boots, a transducer module may be hot plugged later. By a transducer module being hot plugged to the base unit is meant that the transducer module is connected electrically to the base unit at a time when the base unit is already powered up. Hot plugging of a transducer module may also occur by disconnecting a transducer module from a powered up hearing device assembly and connecting another, or the same, transducer module.

The transducer module may comprise a connector, such as a plug connector, configured for providing mechanical and/or electrical and/or acoustical connection of the transducer module to the base unit. The connector may be configured for providing detachable connection of the transducer module to the base unit. In the case the transducer module comprises a plug connector, the base unit may comprise a socket connector configured for being connected with the plug connector. For example, the connector may comprise one or more pads, which connect via one or more springs in a receptacle of the base unit. The transducer module may further comprise a wire and/or acoustical tube, and an earpiece, wherein the wire and/or acoustical tube connects the connector and the earpiece.

In an embodiment, the base unit is further configured to take on the communication role of slave in response to detection of a microcontroller being present in the transducer module, and take on the communication role of master in response to not detecting the presence of a microcontroller in the transducer module. Thus, the base unit communication role is, at least initially, dictated by whether it detects a microcontroller or not within the transducer module. The base unit may detect the presence of the microcontroller in a number of ways, for example, the microcontroller may be configured to assert/activate a second signal on the communication interface/bus. The second signal can then be detected by the base unit.

In an embodiment, the base unit is further configured to take on a communication role in response to a determination of the presence or absence of a second signal asserted by the transducer module. Thus, the communication role of the base unit is, at least initially, dictated by the transducer module.

As a communication role in an asymmetric communication setting between paired/connected electronic entities, an entity may act as either slave or master and, generally, one entity will act as master and the rest as slaves. The master role may comprise initiating, timing and controlling exchange of data, i.e. the entity acting as master may initiate, time and control exchange of data. Further, the master role may comprise controlling the data transfer speed. Data transferred over the communication interface/bus between the transducer module and the base unit may comprise identification data such as base unit identification data and transducer module identification data, transducer calibration data, sensor data, such as real-time sensor data, processed sensor data, such as real-time processed sensor data, commands and status.

The non-volatile memory (NVM) located in the transducer module comprises data and may comprise e.g. identification data and other data. When the base unit is booted or when the transducer module is hot plugged to the base unit, the base unit needs identification information from the transducer module. As described above, a base unit not supporting a transducer module comprising a microcontroller will simply initialize communication and read the content of the NVM. In the improved hearing device assembly, the base unit can additionally receive identification data sent by a microcontroller in the transducer module. Thus, in an embodiment, the base unit is further configured to: —receive identification data sent by the microcontroller in the transducer module in response to detection of a microcontroller being present in the transducer module, and—read identification data from a non-volatile memory (NVM) within the transducer module in response to not detecting the presence of a microcontroller in the transducer module.

The base unit may change from slave to master at a later time, such as after it receives the identification data sent by the microcontroller in the transducer module in which case the base unit only acts as slave during the initial communication from the microcontroller-based transducer module. Thus, in an embodiment the base unit is further configured to take on the communication role of master after receiving identification data sent by the microcontroller in the transducer module. With the base unit acting as slave initially, it can perform other tasks, such as other DSP tasks, while it awaits the data from the transducer module, which first has to boot up. This can allow the base unit, and therefore the entire assembly, to boot faster. If the base unit was acting as master, while the transducer module booted and became ready to transmit data, the base unit would have to wait for the transducer module, possibly polling the transducer module frequently, which might interfere with execution of other tasks, such as other DSP tasks.

The hearing device assembly may be a headset, headphone, earphone, hearing aid, or other head-wearable hearing device assembly, wherein hearing aids are configured to compensate for a user's hearing loss.

In an embodiment, if the transducer module comprises a microcontroller, the microcontroller is configured to boot when power is supplied by the base unit, the microcontroller-based transducer module, if present, is further configured to assert/activate a second signal on the communication interface/bus, and the base unit is further configured to take on a communication role in response to a determination of the presence or absence of the second signal. I.e. the base unit is configured to act as master or slave in response to the determination of the presence or absence of the second signal.

By microcontroller is meant one of an off-the shelf microcontroller, an ASIC logic controller or Field programmable gate arrays (FPGAs), optionally with a support circuit such as an non-volatile memory (NVM) e.g. a EEPROM, a programmable logic unit or the like.

If the transducer module comprises a microcontroller it is a microcontroller-based transducer module and is referred to as such. The boot of the microcontroller is a separate event from the boot of the base unit described above as it only occurs if the transducer module is a microcontroller-based transducer module and as it occurs after the base unit has detected presence of the transducer module and has applied power to it.

The transducer module may comprise an NVM, which contains transducer module identification data. If the transducer module is a microcontroller-based transducer module, the NVM containing transducer module identification data may be comprised within and/or embedded in the microcontroller.

In an embodiment, the transducer module comprises one or more receivers, and/or one or more microphones, and/or one or more sensors and/or electromechanical devices. The one or more sensors may provide one or more of a fall detection signal, a free fall detection signal, an environmental signal (e.g. indicative of temperature or humidity), a capacitive switch signal (e.g. indicative of whether the transducer module, i.e. an earpiece of the transducer module, is in an ear), a pressure signal, a heart-beat rate signal, a snore detection signal, a gyroscope sensor signal (e.g. from a gyro sensor), a movement detection signal (e.g. from acceleration sensor(s)) and/or a tactile feedback signal (e.g. from a user interface sensor). In a microcontroller-based transducer module, the one or more sensors may be configured to forward sensor data, such as real-time sensor data, to the base unit. In a microcontroller-based transducer module, the one or more sensors may be controlled by the microcontroller and the microcontroller may be configured to process sensor data, such as real-time sensor data, before forwarding them to the base unit.

If the transducer module is a microcontroller-based transducer module it can assert/activate a second signal on the communication interface/bus, which the base unit can detect and thereby determine whether the second signal is present or absent. Thus, the presence or absence of the second signal can be used to indicate to the base unit whether the transducer module is a microcontroller-based transducer module or not. The base unit can then react by taking on a communication role in response to the determination of the presence or absence of the second signal. Thus, the communication role is dictated by the transducer module.

In an embodiment, the base unit is further configured to take on the communication role of slave in response to detection of the second signal, and the microcontroller is configured to take on the communication role of master. If the base unit detects the second signal, this means that the transducer module is a microcontroller-based transducer module and the base unit takes on the communication role of slave and the microcontroller takes on the role of master.

An advantage of the microcontroller-based transducer module acting as master is that data will only be transferred when data in the transducer module is available and ready. This is in contrast to a polled method, e.g. frequent pinging, where the base unit needs to check at regular intervals if data is ready and if this is not the case, it will have to check again later. Such frequent pinging will use power from the battery and may cause noise such as artifacts to appear in the delicate audio processing circuitry of the hearing aid assembly. Thus, acoustical artifacts generated by the digital transmissions can be reduced by minimizing the number of data exchanges such as communication events and/or communication bursts.

In an embodiment, the base unit is further configured to take on the communication role of master in response to not detecting the second signal, i.e. if the transducer module is not a microcontroller-based transducer module, the base unit will act as master and the transducer module as slave.

In an embodiment, the base unit is further configured to wait a predetermined time after supplying power to the transducer module, and determine that the second signal is not present if it is not detected within the predetermined time. The predetermined time that the base unit waits may be 5 ms or less than 5 ms or less than 4 ms or less than 3 ms. The skilled person will know that a reasonable predetermined time within which the base unit waits can be experimentally determined.

In an embodiment, the base unit is further configured to enter a low-power communication mode when taking the communication role as slave and the microcontroller-based transducer module has indicated that data transfer is not required, and the base unit is further configured to power the communication mode up again when requested to do so by the microcontroller-based transducer module. This may also be referred to as the functionality handling communication of the base unit entering a sleep mode. Once data is ready to be transferred from the transducer module to the base unit, the transducer module may transmit a wake signal via the communication interface/bus, or, in the case of a single-wire, pulse the single wire signal and this wake signal or pulse wakes up the functionality handling communication in the base unit such that data can be transferred. Thus, the data transfer is initiated by the transducer module. During the low-power communication mode battery power will be preserved. A request from the microcontroller-based transducer module to wake up the base unit may be in the form of an interrupt request generated within the base unit.

In an embodiment, the microcontroller-based transducer module provides options for the base unit to send commands to the transducer module. For example, if the base unit needs to control a function in the transducer module upon request from the hearing aid user, the microcontroller-based transducer module acting as master can provide a way for the base unit acting as slave to send one or more commands to the transducer module.

In the second aspect, the method of assigning communication roles between a behind-the-ear base unit and an in-the-ear transducer module in a hearing device assembly, where the base unit and the transducer module are configured to electronically communicate via a communication interface/bus connecting the base unit and the transducer module, comprises:

- the base unit booting or the transducer module being hot plugged to the base unit,
- the transducer module asserting a signal on the communication interface,
- the base unit detecting the signal asserted by the transducer module, and
- the base unit supplying power to the transducer module following detection of the signal, and
- the base unit detecting whether the transducer module comprises a microcontroller.

In the second aspect, the terms and features relate to the terms and features having the same name in the first aspect and therefore the descriptions and explanations of terms and features given above apply also to the second aspect.

In some embodiments, the method further comprises the base unit taking on a communication role in response to detection of whether a microcontroller is present in the transducer module or not, wherein the base unit taking on a communication role comprises:

- if a microcontroller is detected, the base unit taking on the communication role of slave, and
- if a microcontroller is not detected, the base unit taking on the communication role of master.

In an embodiment, the method further comprises the base unit taking on a communication role in response to a determination of the presence or absence of a second signal asserted by the transducer module.

In an embodiment, if the transducer module comprises a microcontroller, the microcontroller is configured to boot when power is supplied by the base unit, and the method further comprises:

- if present, the microcontroller-based transducer module asserting a second signal on the communication interface,
- the base unit determining the presence or absence of the second signal, and
- the base unit taking on a communication role in response to the determination of the presence or absence of the second signal.

If the transducer module comprises a microcontroller, it is called a microcontroller-based transducer module. The conditional "if the transducer module comprises a microcontroller" only applies to the presence of the microcontroller and its configuration not to the method steps following.

In an embodiment, the method further comprises:

- the base unit taking on the communication role of slave in response to detection of the second signal, and
- the microcontroller taking on the communication role of master.

In an embodiment, the method further comprises the base unit taking on the communication role of master in response to not detecting the second signal.

In an embodiment, the method further comprises:

- the base unit waiting a predetermined time after supplying power to the transducer module, and
- the base unit determining that the second signal is not present if it is not detected within the predetermined time.

In some embodiments, the method further comprises the base unit obtaining identification data, which identifies the transducer module, in response to detection of whether a microcontroller is present in the transducer module or not, and obtaining identification data comprises:

- if a microcontroller is detected, the base unit receiving identification data sent by the microcontroller in the transducer module, or
- if a microcontroller is not detected, the base unit reading identification data from a non-volatile memory (NVM) within the transducer module.

In some embodiments, the method further comprises the base unit taking on the communication role of master after receiving identification data sent by the microcontroller in the transducer module.

In an embodiment, if the base unit has taken on the communication role as slave, the method further comprises:

- the base unit entering a low-power communication mode when the microcontroller-based transducer module has indicated that data transfer is not required, and
- the base unit powering the communication mode up again when requested to do so by the microcontroller-based transducer module.

In some embodiments, the microcontroller-based transducer module comprises one or more sensors, and the method further comprises the one or more sensors forwarding sensor data, such as real-time sensor data, to the base unit.

In some embodiments, the microcontroller-based transducer module comprises one or more sensors, and the method further comprises the microcontroller controlling the one or more sensors, and/or the microcontroller receiving sensor data, such as real-time sensor data, from the one or more sensors and processing the sensor data and/or forwarding the sensor data to the base unit. The sensor data may be forwarded by the microcontroller after being received and processed by the microcontroller.

The one or more sensors may provide one or more of a fall detection signal, a free fall detection signal, an environmental signal (e.g. indicative of temperature or humidity), a capacitive switch signal (e.g. indicative of whether the transducer module, i.e. an earpiece of the transducer module, is in an ear), a pressure signal, a heart-beat rate signal, a snore detection signal, a gyroscope sensor signal (e.g. from a gyro sensor), a movement detection signal (e.g. from acceleration sensor(s)) and/or a tactile feedback signal (e.g. from a user interface sensor).

BRIEF DESCRIPTION OF THE DRAWINGS

In the following, exemplary embodiments are described in more detail with reference to the appended drawings, wherein.

DETAILED DESCRIPTION OF EMBODIMENTS

Figure 1A:
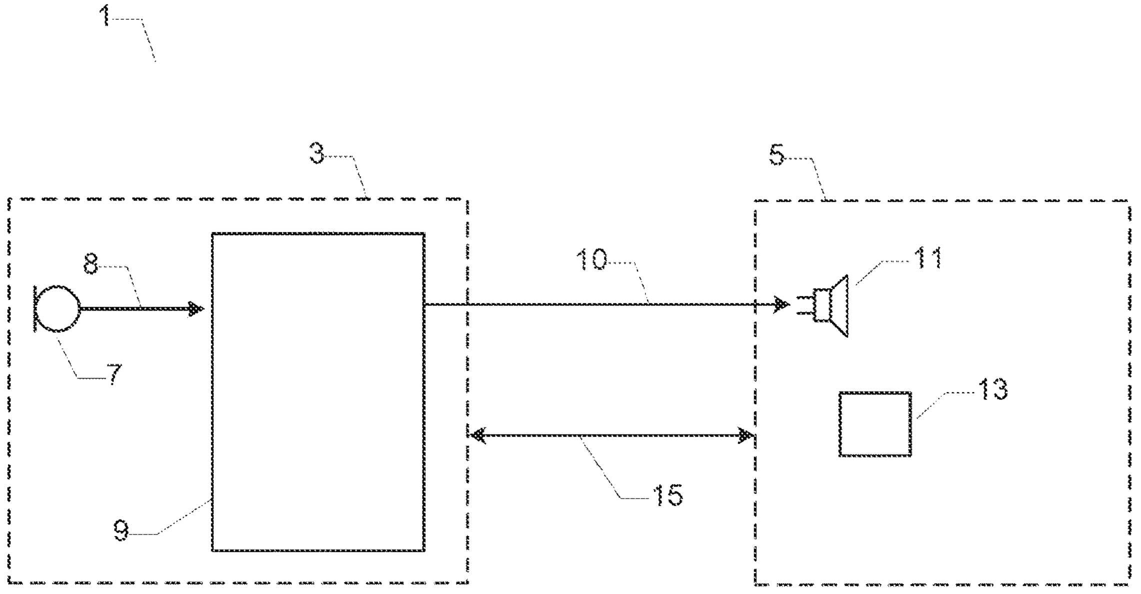
FIGS. 1A and 1B schematically illustrate a hearing device assembly in accordance with exemplary embodiments, FIGS. 2A and 2B schematically illustrate another hearing device assembly in accordance with exemplary embodiments.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIGS. 1A, 1B, 2A and 2B schematically illustrate a hearing device assembly 1 having a base unit 3 and a transducer module 5. During use, the base unit 3 is placed behind the ear of the user and it has one or more microphones 7 and an audio processing unit 9, which processes any audio signals 8 received from the one or more microphones 7 or, optionally, via a wireless or wired communication interface/bus (not shown). Processed audio signals 10 are transmitted to a receiver 11 in the transducer module 5 so that audible sound may be generated and/or provided to the user. When the hearing device assembly 1 is in use, the transducer module 5 is located at or in the ear of the user and the audible sound generated by the receiver 11 is generated close to or in the ear canal of the user.

In the hearing device assembly 1 shown in FIG. 1A the transducer module 5 has a non-volatile memory (NVM) 13, such as an EEPROM, which can communicate electronically with the base unit 3 via a communication interface/bus 15, such as a single wire interface or multiple wire interface 15 connecting the base unit 3 and the transducer module 5 and/or connecting the base unit 3 directly with the NVM 13.

Figure 1B:
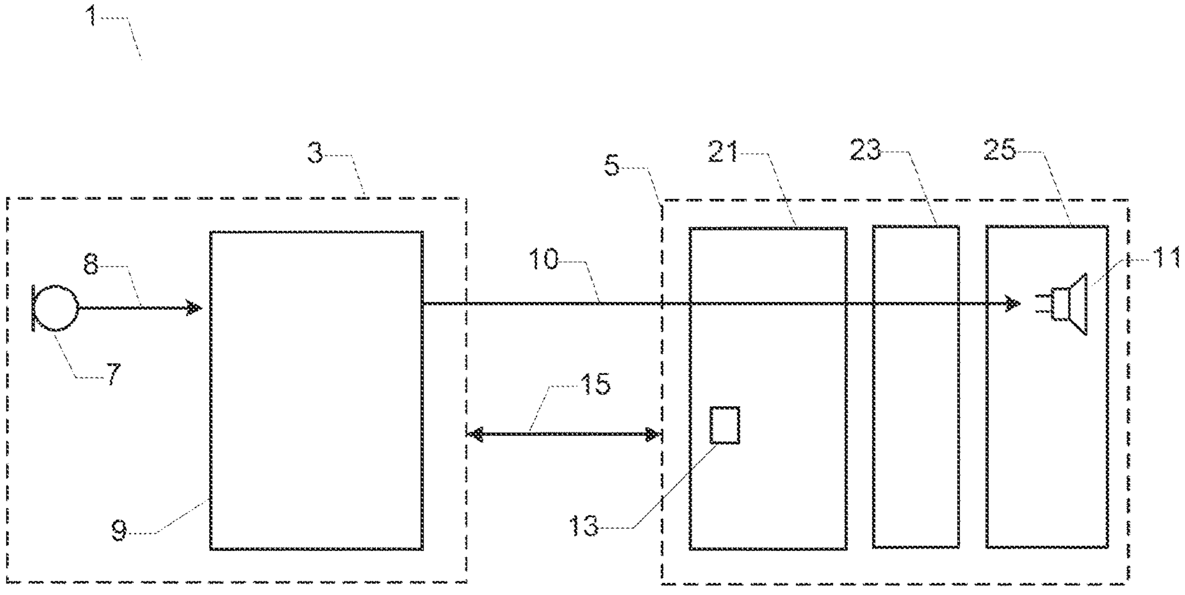

The hearing device assembly shown in FIG. 1B illustrates an embodiment, wherein the hearing device assembly 1 is a receiver-in-ear-type hearing aid. The transducer module 5 comprises a connector 21, a wire or cable 23 and an earpiece 25. The connector 21 may be a plug connector. The connector 21 may be configured for mechanical and/or electrical connection and/or acoustic connection, such as an acoustical tube, with the base unit 3. The connector 21 may be configured for detachable connection with the base unit 3. The wire 23 may run through a wire tube. The earpiece 25 may be configured to be located at or in the ear canal of a user. The connector 21 comprises the NVM 13 and is connected by the wire 23 and optionally by the wire tube to the earpiece 25, which comprises the receiver 11.

Figure 2A:
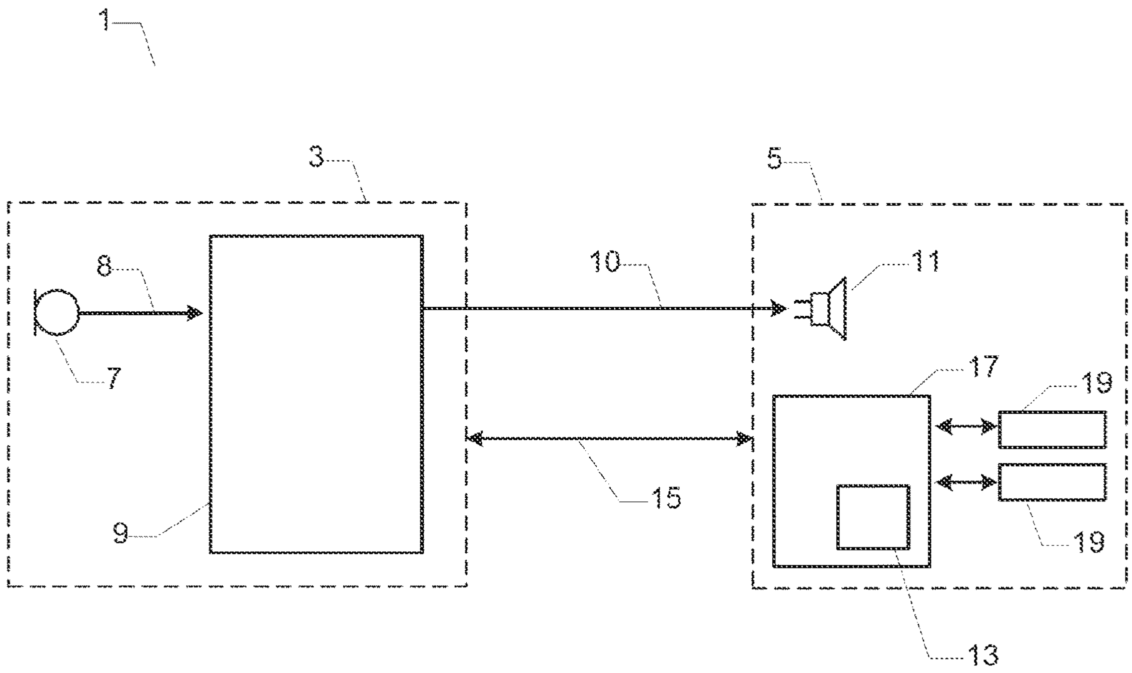

In the hearing device assembly 1 shown in FIG. 2A the transducer module 5 has a microcontroller 17, which comprises an NVM 13. Thus, the transducer module 5 in FIG. 2 is a microcontroller-based transducer module 5. The microcontroller 17 can communicate electronically with the base unit 3 via a communication interface/bus 15, such as a single wire interface or multiple wire interface 15 connecting the base unit 3 and the transducer module 5 and/or connecting the base unit 3 directly with the microcontroller 17.

Figure 2B:
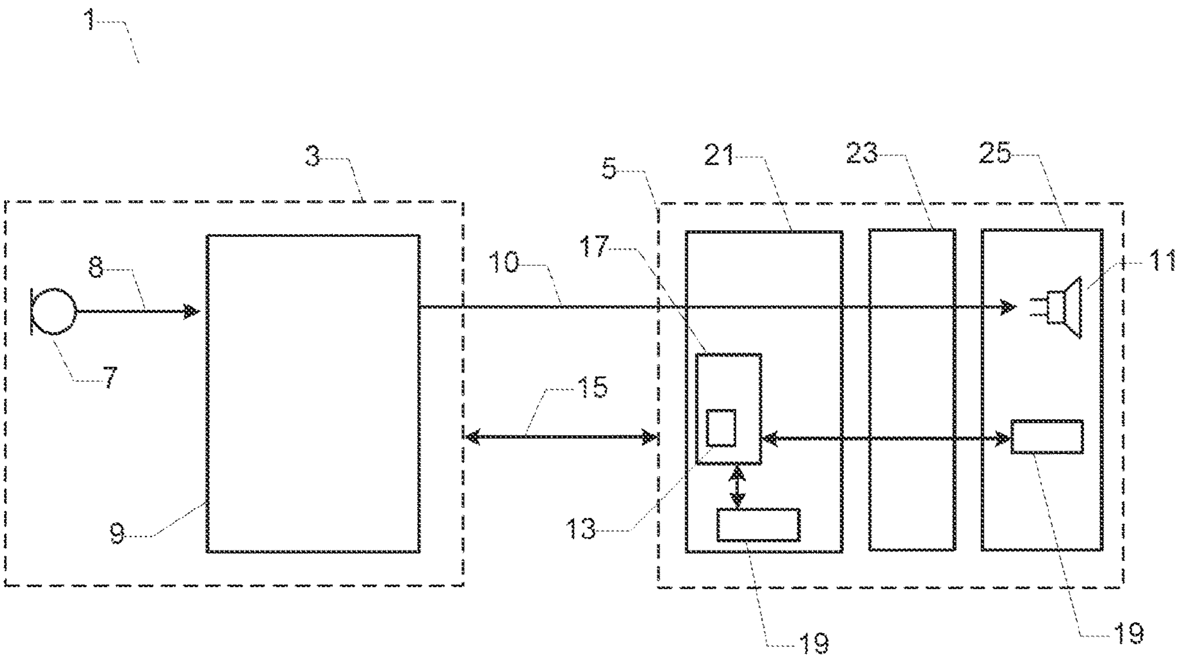

The hearing device assembly shown in FIG. 2B illustrates an embodiment, wherein the hearing device assembly 1 is a receiver-in-ear-type hearing aid. The transducer module 5 comprises a connector 21, a wire 23 and an earpiece 25. The connector 21 may be a plug connector. The connector 21 may be configured for mechanical and/or electrical connection with the base unit 3. The connector 21 may be configured for detachable connection with the base unit 3. The wire 23 may run through a wire tube. The earpiece 25 may be configured to be located at or in the ear canal of a user. The connector 21 comprises the microcontroller 17 and is connected by the wire 23 and optionally by the wire tube to the earpiece 25, which comprises the receiver 11. Any sensors 19 comprised in the hearing device assembly shown in FIG. 2A may be located in the connector 21 and/or in the earpiece 25.

The following applies to any hearing device assembly shown in FIGS. 1A, 1B, 2A and 2B unless specifically noted by referring to the microcontroller or to a microcontroller-based transducer module.

The base unit 3 has its own power source (not shown), which may e.g. be a battery, and the base unit 3 supplies power to the transducer module 5. If the base unit 3 is turned off or if the transducer module 5 has been disconnected from the base unit 3, the supply of power from the base unit 3 to the transducer module 5 is turned off.

If either the base unit 3 boots following it being turned on, for instance by the flip of a switch or other common means, or if a transducer module 5 is hot plugged to an already booted base unit 3, the transducer module 5 asserts/activates a signal on the communication interface/bus 15, i.e. a communication interface signal such as a single wire signal or one or more signals on a multiple wire interface. This signal is detected by the base unit 3, which responds to the detection of the signal by supplying power to the transducer module 5. Thus, by asserting a signal on the communication interface/bus 15, the transducer module 5 signals to the base unit 3 that it is connected.

For example, while power to the transducer module 5 is turned off, because the base unit 3 is either turned off or because the transducer module 5 is disconnected, the base unit 3 can provide a permanent weak pull-up of the communication interface signal, i.e. a permanent weak pull-up on the communication interface. The transducer module 5, however, provides a strong pull-up of the communication interface signal, but because power to the transducer module 5 is turned off this will work as a strong pull-down, which will drive the communication interface signal low. The base unit 3 detects the low level and concludes that a transducer module 5 must be connected and in response the base unit 3 supplies power to the transducer module 5. The supply of power from the base unit 3 to the transducer module 5 will then drive the communication interface signal high.

The base unit 3 is configured such that the communication role it assumes is dictated by the transducer module 5. If the transducer module 5 has a microcontroller 17, the microcontroller 17 will boot when power is supplied by the base unit 3 to the transducer module 5. The microcontroller-based transducer module 5 will assert/activate a second signal on the communication interface/bus 15, for example by asserting the communication interface signal low for a specific period of time. If the transducer module 5 does not comprise a microcontroller the communication interface signal will remain high. The base unit 3 can then take on a communication role in response to a determination of the presence or absence of the second signal.

If the second signal, e.g. the asserted low level of the communication interface signal, is detected by the base unit 3 it will take on the communication role of slave and the microcontroller 17 will take on the communication role of master. If the second signal is not detected by the base unit 3 it will take on the communication role of master and in this case, the NVM 13 in the transducer module 5 will act as slave. Thus, a microcontroller-based transducer module 5 will take the communication role of master, whereas a transducer module 5, which does not have a microcontroller 17, will be relegated the communication role of slave and the base unit 3 will then act as master.

The base unit 3 may be programmed to wait a predetermined time after supplying power to the transducer module 5 so as to wait for the second signal from the microcontroller 17, if present, and if the second signal has not been detected within the predetermined time, the base unit 3 will determine that a second signal is not present. The predetermined time that the base unit waits may be 5 ms or less than 5 ms or less than 4 ms or less than 3 ms. The skilled person will understand that a reasonable predetermined time within which the base unit 3 waits can be selected based on experiments and various criteria.

After the communication roles have been taken on, the master will initiate, time and control exchange of data. Further, the master role may also include controlling the data transfer speed.

In the case, where the base unit 3 takes on the communication role of master, it will issue a command to retrieve the information stored on the NVM 13 in the transducer module 5 such as e.g. transducer module identification data and production calibration offsets of various parameters of the transducer module 5, particularly of the receiver 11. This is advantageous in the situation, where the transducer module 5 has been exchanged for another transducer module. After receiving the stored information, the base unit 3 can make appropriate changes to the signal processing to match the altered parameters of the receiver 11. In case of a discrepancy, the base unit 3 can even choose to e.g. not send signals to the transducer module 5 or to send signals that it can be certain will result in low volume audible sound by the receiver 11 to ensure that the user is not distressed or harmed by loud sounds.

When the microcontroller 17 takes on the communication role of master and the base unit 3 takes on the communication role as slave, the base unit 3 can advantageously be configured to enter a low-power communication mode when the microcontroller-based transducer module 5 indicates that data transfer is not required. It will then also be configured to power the communication mode up again when requested to do so by the microcontroller-based transducer module, for example by the transducer module 5 pulsing the communication interface signal. The low-power communication mode is one in which the functionality handling the communication enters a sleep mode. Once data is ready to transfer from the microcontroller-based transducer module 5 to the base unit 3, the functionality handling communication within the base unit 3 wakes up and data can now be transferred initiated by the transducer module 5. The same mechanism can be used at regular intervals to transfer any commands from the base unit 3 to the microcontroller-based transducer module 5, for example by the transducer module 5 transferring a query to the base unit 3 that then responds with a command.

The transducer module 5 may comprises a number of auxiliary units 19 such as one or more sensors and/or electromechanical devices 19. The one or more sensors 9 may provide one or more of a fall detection signal, a free fall detection signal, an environmental signal (e.g. indicative of temperature or humidity), a capacitive switch signal (e.g. indicative of whether the transducer module 5, i.e. the earpiece 25, is in an ear), a pressure signal, a heart-beat rate signal, a snore detection signal, a gyroscope sensor signal (e.g. from a gyro sensor), a movement detection signal (e.g. from acceleration sensor(s)) and/or a tactile feedback signal (e.g. from a user interface sensor). It may also have more than one receiver 11 and/or one or more microphones 19. The one or more receiver 11 and one or more microphone 19 may preferably be arranged in the earpiece 25. If the transducer module 5 is a microcontroller-based transducer module the one or more sensors 19 can be controlled by the microcontroller 17. The microcontroller 17 may then also be configured to process the sensor data and to forward them to the base unit 3.

Figure 3A:
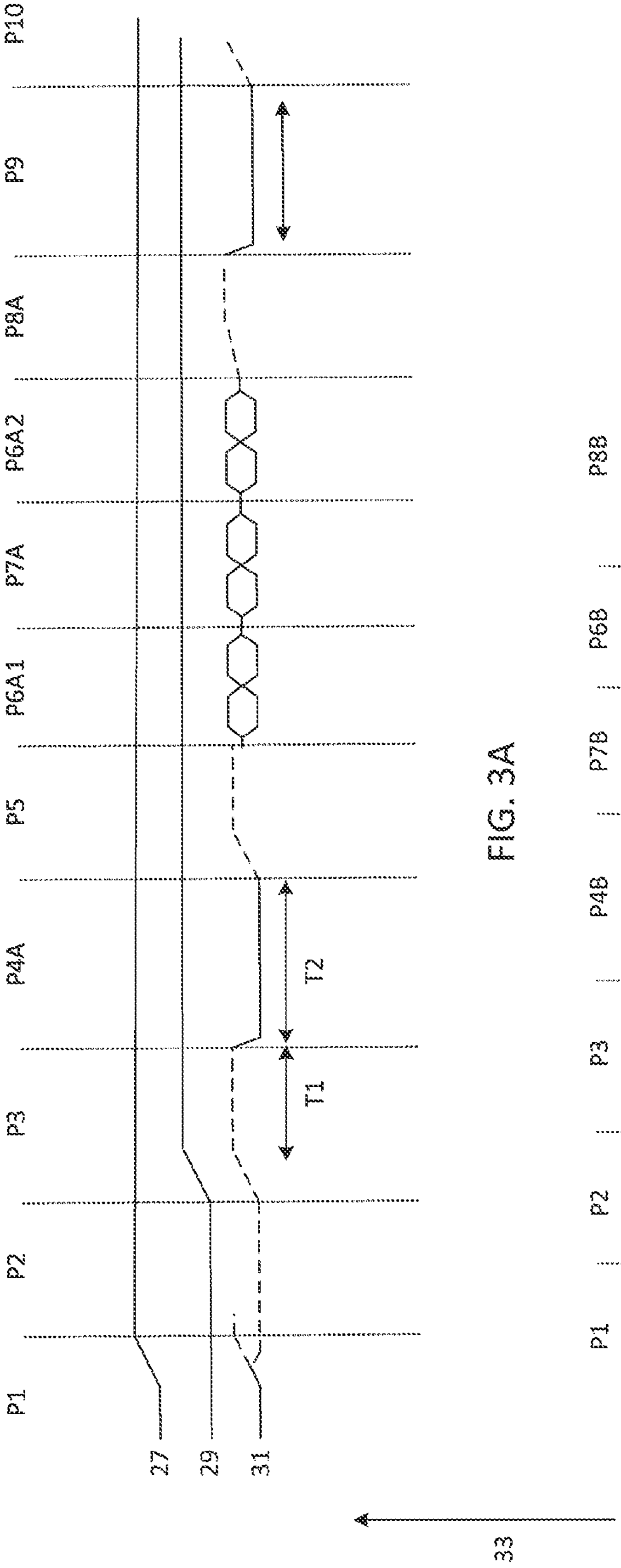
FIGS. 3A and 3B illustrate examples of communication schemes between a base unit and a transducer module.
Figure 3B:
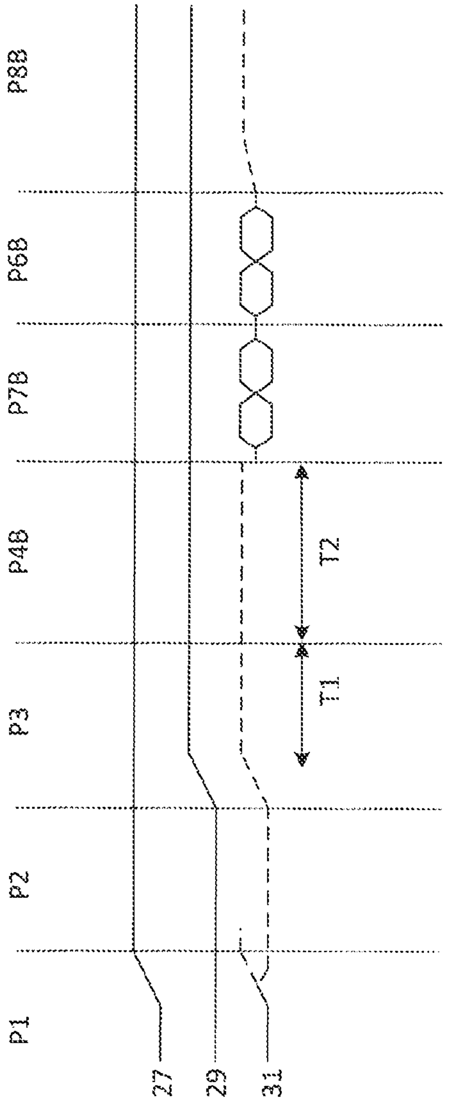

FIGS. 3A and 3B illustrate examples of communication schemes between a base unit and a transducer module as described herein, where the communication progression has been illustratively divided into phases (P1-P10). In FIG. 3A is shown an example of communication between a base unit and a microcontroller-based transducer module, whereas FIG. 3B shows an example of communication between a base unit and a transducer module that does not contain a microcontroller. In the shown examples in FIGS. 3A and 3B the phases occur one after another as time progresses from P1 and towards the right in the figure, i.e. the top of the page. From each phase to the next the base unit power 27, transducer module power 29 and communication interface signal 31 is shown as a line indicating a level that is higher the further to the left on the page it is as given by the arrow 33.

In the first phase P1, the base unit powers up after being switched on and the base unit power 27 increases from an idle state to an operating level. The transducer module power 29 is in an idle state during the phase P1 as it has not yet been turned on. When turned on, the base unit provides a permanent weak pull-up of the communication interface signal 31, i.e. a permanent weak pull-up on the communication interface. If no transducer module is connected to the base unit via a communication interface/bus, this weak pull-up will drive the communication interface signal 31 high. However, if a transducer module is connected to the base unit via a communication interface, the transducer module will provide a strong pull-up to the transducer module power 29 on one or more selected signals 31 of the communication interface, or, in the case of a single wire, from the single wire signal, but because the transducer module power 29 is off, the strong pull-up will work as a strong pull-down driving the selected signal(s)/single wire signal on the communication interface low. This is illustrated by the forking line showing the two possibilities for the communication interface signal 31 during the phase P1.

In phase P2, the communication interface signal 31 is driven low by the transducer module as described above, and the low communication interface signal is detected by the base unit.

After detection of the low communication interface signal, which is the first signal from the transducer module, the base unit concludes that a transducer module must be connected and therefore, in phase P3, the base unit acts to turn on and/or provide power to the transducer module power 29. The strong pull-up from the transducer module on selected signals of the communication interface/bus then drives the communication interface signal 31 high. Neither the base unit nor the transducer module has taken on a communication role as of yet and the base unit acts to detect whether a microcontroller is present within the transducer module. In the example shown in FIGS. 3A and 3B, the base unit first waits a predetermined period of time T1 to give a microcontroller in the transducer module time to boot up.

In phase P4A in FIG. 3A, the base unit waits a second period of time T2 for a signal on the communication interface/bus. During the time period T2, the now booted microcontroller drives the communication interface signal 31 low, which signals its presence to the base unit.

Following this, the transducer module enters a neutral state with respect to the communication interface, i.e. it reverts to the pull-up state as shown in phase P5. The base unit, having detected the second signal initiated by the microcontroller during the time period T2, assumes the communication role of slave and awaits reception of commands from the transducer module.

In phase P6A1 the microcontroller-based transducer module, having the communication role of master, transmits data, which initially could be identification data, and/or transducer calibration data. The base unit responds in phase P7A by transmitting data to the transducer mode and in phase P6A2 the transducer module again transmits data to the base unit, for example sensor data, processed sensor data, commands and status.

After the exchange of data between the base unit and the transducer module is complete, the communication interface signal 31 enters a neutral state with respect to the communication interface, i.e. it reverts to the pull-up state as shown in phase P8A, and the base unit may enter a low power communication mode as it awaits further communication from the transducer module.

In phase P9, the transducer module signals to the base unit to power the communication mode up again by driving the communication interface signal 31 low and a new series of transmissions between the base unit and transducer module may begin. Alternatively, after the initial communication, where the transducer module was master and the base unit was slave, the communication roles may be switched such that the base unit takes over the communication role as master.

In FIG. 3B, no microcontroller is present in the transducer module and the communication interface signal 31 remains the same during phase P4B, which leads the base unit to conclude that no microcontroller is present in the transducer module. The base unit assumes the communication role of master and initiates communication with the transducer module in phase P7B, for example to read identification data from a non-volatile memory (NVM) within the transducer module. Throughout the communication shown in FIG. 3B, the transducer module will have the role of slave in its communication with the base unit. In phase P6B the transducer module responds to the initiated communication from the base unit. After the transfer of data from the transducer module in phase P6B is complete, the communication interface signal 31 enters a neutral state with respect to the communication interface/bus, i.e. it reverts to the pull-up state as shown in phase P8B.

Figure 4:
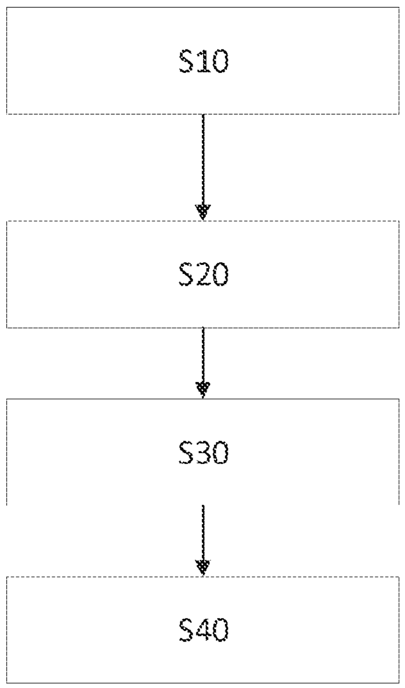
FIG. 4 is a flow diagram in accordance with exemplary embodiments.

FIG. 4 shows a flow diagram of a method of assigning communication roles between a behind-the-ear base unit 3 and an in-the-ear transducer module 5 in a hearing device assembly 1 such as those shown in FIGS. 1 and 2, where the base unit 3 and the transducer module 5 are configured to electronically communicate via a communication interface/bus 15 connecting the base unit 3 and the transducer module 5.

In step S10 the base unit 3 boots after being turned on, for instance by the flip of a switch or other common means, or a transducer module 5 is hot plugged to an already booted base unit 3.

In step S20 the transducer module 5 asserts/activates a signal on the communication interface 15 connecting the base unit 3 and the transducer module 5.

In step S30 the base unit 3 detects the signal asserted by the transducer module 5 and responds to the detection of the signal by supplying power to the transducer module 5.

In step S40 the base unit 3 takes on a communication role in response to a determination of the presence or absence of a second signal asserted by the transducer module 5. Thus, the communication role is dictated by the transducer module 5.

Figure 5:
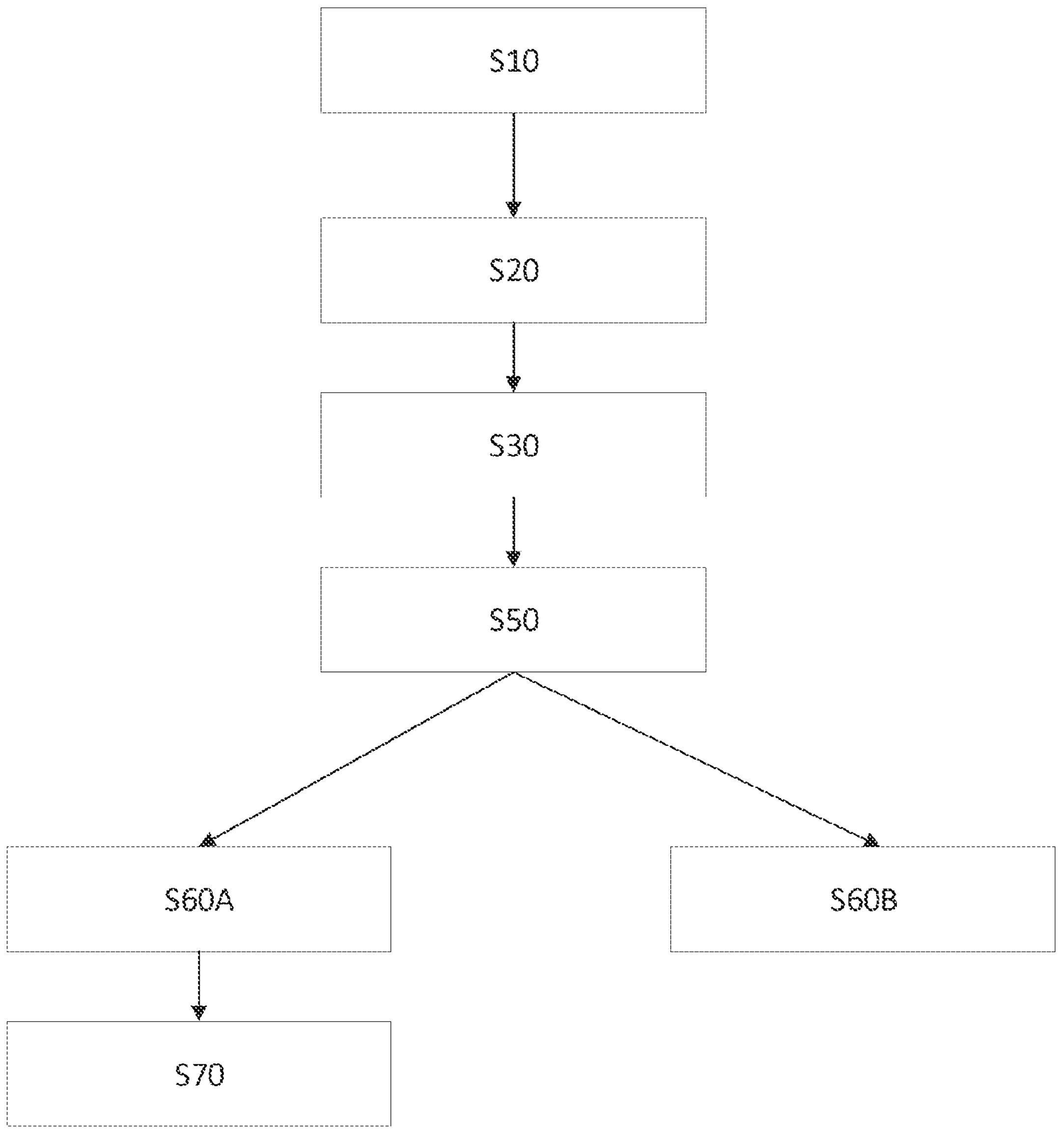
FIG. 5 is another flow diagram in accordance with exemplary embodiments.

FIG. 5 shows another flow diagram of a method of assigning communication roles between a behind-the-ear base unit 3 and an in-the-ear transducer module 5 in a hearing device assembly 1 such as those shown in FIGS. 1 and 2, where the base unit 3 and the transducer module 5 are configured to electronically communicate via a communication interface/bus 15 connecting the base unit 3 and the transducer module 5. Steps S10-S30 are the same as described above.

If the transducer module 5 comprises a microcontroller 17 it is said to be a microcontroller-based transducer module and the microcontroller 17 is configured to boot when power is supplied by the base unit 3 to the transducer module 5.

In step S50 the microcontroller-based transducer module 5, if present, asserts/activates a second signal on the communication interface 15 and the base unit 3 determines the presence or absence of the second signal. If the base unit 3 determines that the second signal is present, the method proceeds to step S60A, whereas if the base unit 3 determines that the second signal is not present, the method proceeds to step S60B.

In step S50 the determination of the presence or absence of the second signal may further entail the base unit waiting a predetermined time after supplying power to the transducer module, and the base unit determining that a second signal is not present if it is not detected within the predetermined time.

In steps S60A and S60B the base unit 3 takes on a communication role in response to the determination of the presence or absence of the second signal.

In step S60A the base unit 3 takes on the communication role of slave in response to detection of the second signal, and the microcontroller 17 takes on the communication role of master.

In step S60B the base unit 3 takes on the communication role of master in response to not detecting the second signal.

Thus, a microcontroller-based transducer module 5, or rather the microcontroller 17 in the microcontroller-based transducer module 5, will take the communication role of master, whereas a transducer module 5, which does not have a microcontroller 17, will be relegated the communication role of slave and the base unit 3 will then act as master.

In step S70, where the base unit 3 has taken on the communication role as slave, the base unit 3 enters a low-power communication mode when the microcontroller-based transducer module 5 has indicated that data transfer is not required, and the base unit 3 powers the communication mode up again when requested to do so by the microcontroller-based transducer module 5.

LIST OF REFERENCES

- 1 Hearing device assembly
- 3 Base unit
- 5 Transducer module/microcontroller-based transducer module
- 7 Microphone
- 8 Audio signals
- 9 Audio processing unit
- 10 Processed audio signals
- 11 Receiver
- 13 Non-volatile memory (NVM)
- 15 Communication interface
- 17 Microcontroller
- 19 Auxiliary unit/sensor/electromechanical device/microphone
- 21 Connector
- 23 Wire/cable
- 25 Earpiece
- 27 Base unit power
- 29 Transducer module power
- 31 Communication interface (signal)
- 33 Arrow indicating a higher level

The invention claimed is:

1. A hearing device assembly comprising:

a behind-the-ear unit; and an in-the-ear transducer module;

wherein the behind-the-ear unit and the transducer module are configured to electronically communicate via a communication interface connecting the behind-the-ear unit and the transducer module;

wherein the transducer module is configured to assert a signal via the communication interface during boot of the behind-the-ear unit or when the transducer module is coupled to the behind-the-ear unit; and wherein the behind-the-ear unit is configured to detect the signal asserted by the transducer module, and wherein the behind-the-ear unit is also configured to determine whether the transducer module comprises a microcontroller.

2. The hearing device assembly according to claim 1, wherein the behind-the-ear unit is configured to take on a communication role of a slave based on a detection of the microcontroller in the transducer module.

3. The hearing device assembly according to claim 1, wherein the behind-the-ear unit is configured to take on a communication role of a master if the behind-the-ear unit determines that the transducer module does not comprise the microcontroller.

4. The hearing device assembly according to claim 1, wherein the behind-the-ear unit is configured to take on a communication role based on a presence or an absence of another signal asserted by the transducer module.

5. The hearing device assembly according to claim 4, wherein the behind-the-ear unit is further configured to:

wait a predetermined time after supplying power to the transducer module, and determine that the other signal is not present if it is not detected within the predetermined time.

6. The hearing device assembly according to claim 1, wherein the transducer module comprises the microcontroller, and wherein the behind-the-ear unit is configured to receive identification data sent by the microcontroller in the transducer module.

7. The hearing device assembly according to claim 1, wherein the transducer module comprises the microcontroller, and wherein the behind-the-ear unit is configured to take on a communication role of a master after receiving identification data sent by the microcontroller in the transducer module.

8. The hearing device assembly according to claim 1, wherein the transducer module does not comprise the microcontroller, and wherein the behind-the-ear unit is configured to read identification data from a non-volatile memory in the transducer module.

9. The hearing device assembly according to claim 1, wherein the behind-the-ear unit is configured to enter a first communication mode when taking a communication role as a slave; and wherein the behind-the-ear unit is configured to enter a second communication mode when requested to do so by the transducer module.

10. The hearing device assembly according to claim 9, wherein the first communication mode is associated with a first power level, the second communication mode is associated with a second power level, and wherein the first power level is different from the second power level.

11. The hearing device assembly according to claim 1, wherein the transducer module comprises one or more receivers, one or more microphones, one or more sensors, one or more electromechanical devices, or any combination of the foregoing.

12. A method performed by a hearing device assembly that includes a behind-the-ear unit and an in-the-ear transducer module, the behind-the-ear unit and the transducer module being configured to electronically communicate via a communication interface connecting the behind-the-ear unit and the transducer module, the method comprising:

asserting, by the transducer module, a signal via the communication interface, wherein the signal is asserted during booting of the behind-the-ear unit, or when the transducer module is coupled to the behind-the-ear unit;

detecting, by the behind-the-ear unit, the signal asserted by the transducer module; and determining, by the behind-the-ear unit, whether the transducer module comprises a microcontroller or not.

13. The method according to claim 12, further comprising taking on a communication role by the behind-the-ear unit based on a result from the act of determining whether the transducer module comprises the microcontroller or not.

14. The method according to claim 13, wherein if the behind-the-ear unit determines that the transducer module comprises the microcontroller, the behind-the ear unit takes on the communication role of a slave.

15. The method according to claim 13, wherein if the behind-the-ear unit determines that the transducer module does not comprise the microcontroller, the behind-the-ear unit takes on the communication role of a master.

16. The method according to claim 12, further comprising taking on a communication role, by the behind-the-ear unit, based on a presence or an absence of another signal asserted by the transducer module.

17. The method according to claim 16, further comprising waiting a predetermined time, by the behind-the-ear unit, after supplying power to the transducer module, and determining that the other signal is not present if it is not detected within the predetermined time.

* * * * *